Patented July 21, 1942

2,290,604

UNITED STATES PATENT OFFICE 2,290,604

ALKYLATION OF PHENOLS

Donald R. Stevens, Swissvale, and Joseph E. Nickels, Pittsburgh, Pa., assignors to Gulf Research & Development Company, Pittsburgh, Pa., a corporation of Delaware No Drawing. Application January 12, 1940, Serial No. 313,632

7 Claims. (Cl. 260—624)

This invention relates to the alkylation of phenols; and it comprises an improved method of producing alkylated phenols in which a phenolic material is mixed with at least about 5.0 per cent by weight of sulfuric acid and with a polyhydric alcohol in an amount corresponding to about 35.0 to 85.0 per cent by weight of the sulfuric acid, the mixture is treated at a temperature of about 20° to 100° C. with a branched-chain olefin and the alkylated phenol products separate from the mixture of sulfuric acid and polyhydric alcohol which is recovered and may be reused in the alkylation of further quantities of phenolic materials; all as more fully hereinafter set forth and as claimed.

In the processes heretofore proposed for the production of alkylated phenols by the treatment of a phenolic material with an olefin in the presence of sulfuric acid, it has been customary to effect the alkylation in the presence of a catalytic amount of the concentrated acid, that is to say, an amount corresponding to less than about 5.0 per cent by weight of the phenolic material usually about 1.0 to 2.0 per cent. It has been found that considerable difficulty is encountered in the practice of this process in obtaining satisfactory contact between the relatively large amount of the reactants and the relatively small amount of catalyst. This difficulty can be partially overcome in batch operation by increasing the contact period which, however, increases cost of operation and may make the process so slow as to be impractical commercially. In continuous operation it has been substantially impossible to obtain sufficiently good contact between the catalyst and reactants or a sufficiently long contact period to obtain optimum yields.

Furthermore, it is difficult or impossible to effect a quick separation of the small amount of sulfuric acid from the large amount of reaction products and it is customary simply to neutralize the acid and wash before fractionating the reaction products to recover individual alkylated phenols. This procedure involves a complete loss of the catalyst and an additional cost for the neutralizing agent, which adds materially to the cost of operation.

When it is attempted to overcome these difficulties by using concentrated sulfuric acid in relatively large amounts the increased activity of the sulfuric acid causes undesirable side reactions including polymerization of the olefins and sulfonation of the phenols and the like. These side reactions use up the reactants and deleteriously affect the yield of the process. Also large amounts of sulfuric acid favor a system containing relatively large amounts of unreacted phenols perhaps due to a dealkylating action. This also reduces the yield of the process. Furthermore, the excess sulfuric acid used as the condensing agent is not readily separable from the reaction products and cannot be used for alkylation of further quantities of phenols. The use of large amounts of sulfuric acid has not therefore proved successful.

It is an object achieved by the present invention to provide an improved method for the alkylation of phenols with olefins in the presence of sulfuric acid in which a relatively large volume of acid condensing agent is used without causing undesirable side reactions and in which the acid condensing agent is substantially completely recovered and may be used for the alkylation of further quantities of phenols.

We have discovered that when a phenol is alkylated with a branched-chain olefin in the presence of a condensing agent consisting essentially of sulfuric acid mixed with about 35.0 to 85.0 per cent of its weight of a polyhydric alcohol and the condensing agent is used in an amount sufficient to provide a quantity of sulfuric acid corresponding to at least about 5.0 per cent by weight of the phenol, that the alkylation can be carried out at temperatures from 20° to 100° C. and intimate contact between the acid condensing agent and the reactants can be readily obtained even in continuous operation, whereby the time usually required for effective contact can be substantially shortened and improved yields of alkylated phenols can be obtained without excessive side reactions, and that the sulfuric acid-polyhydric alcohol condensing agent can be readily separated from the alkylated phenol reaction products by stratification and is suitable for use in the alkylation of further quantities of phenols.

We have found also that the proportion of polyhydric alcohol to sulfuric acid in the condensing agent affects the nature of the alkylated phenol end products obtained. When mixtures containing about 35.0 to 60.0 per cent by weight of polyhydric alcohol are used a very high yield of a product in which two or more molecules of the olefin have been introduced into the phenol is obtained with a small amount of a product in which only one molecule of olefin has been substituted in the phenol. On the other hand, mixtures containing about 65.0 to 85.0 per cent of a polyhydric alcohol favor the production of a larger amount of a product in which one molecule of olefin has been substituted in the original phenol and a lesser amount of a product in which two or more molecules of olefin have combined with the phenol. Thus by adjusting the ratio of polyhydric alcohol to sulfuric acid we are able to regulate the relative proportions of mono- and di-alkylated phenol obtained.

In carrying out the method of our invention the sulfuric acid is customarily first mixed with a polyhydric alcohol such as glycerine, ethylene glycol, diethylene glycol and the like. Sulfuric acid of ordinary commercial concentration is customarily used. The amount of polyhydric alcohol incorporated in the mixture may be varied over a relatively wide range depending on the exact processing conditions under which it is to be used and the nature of the end products desired. In general, however, we have found that in order to obtain an acid condensing mixture which may be used in sufficient amount to provide sulfuric acid in the reaction mixture in an amount corresponding to at least 5.0 per cent by weight of the phenol without undesirable side reactions and one which readily separates from the reaction products, the sulfuric acid-polyhydric alcohol should contain at least about 35.0 per cent by weight of polyhydric alcohol. This percentage may be increased with advantage up to about 85 per cent by weight. As the amount of polyhydric alcohol is increased the activity of the mixture as a condensing agent decreases and when it is desired to effect alkylation of the phenol with two or more molecules of olefin a mixture containing not over about 60 per cent of a polyhydric alcohol is most advantageous. Mixtures of sulfuric acid and glycerin containing 45.0 to 55.0 per cent by weight of glycerin have proved particularly advantageous for di-alkylation when used in amounts sufficient to provide 20.0 to 40.0 per cent of sulfuric acid on the weight of the phenol, and mixtures of sulfuric acid and glycerin containing 70.0 to 80.0 per cent glycerin when used in amount sufficient to provide 20 to 40 per cent of sulfuric acid are particularly useful for the production of alkylated phenol mixtures in which a mono-alkylated phenol predominates.

The sulfuric acid-polyhydric alcohol condensing agents may be used with advantage in the alkylation of phenols either in a batch type or continuous process. In batch operation a sulfuric acid-polyhydric alcohol mixture such as a sulfuric acid-glycerin mixture is customarily first introduced into a reaction vessel with the phenol or phenolic material to be alkylated. The reaction mass is heated to a temperature between about 20° and 100° C. and is vigorously agitated. A branched-chain olefin containing three or more carbon atoms such as isobutylene or isoamylene is then introduced into the agitated mixture. The olefin is customarily introduced in the form of a gas as a substantially pure compound, although it may be introduced in the form of a mixture of gases such as a refinery butane cut. Introduction of the olefin is continued until no more is taken up by the reaction mixture. Agitation is then stopped and the mixture is allowed to settle.

In a very short time it will be found that the mixture has separated into two layers one of which contains the alkylated phenol reaction products and the other containing the sulfuric acid-polyhydric alcohol condensing agent. The separation is nearly complete and we have found that about 95.0 per cent of the original acid condensing agent can be recovered. The separated layers may be recovered by any usual means. This polyhydric alcohol-sulfuric acid mixture may then be used for the alkylation of further quantities of phenols and the alkylated phenol reaction products may be treated for the isolation of individual alkylated phenols. The individual alkylated phenols are customarily recovered by fractionating the reaction products after washing and neutralizing them to remove any traces of residual acid which may remain in them. The amount of acid remaining in the alkylated phenol reaction products after stratification and separation of the polyhydric alcohol-sulfuric acid mixture is very small and may be readily removed by neutralization and washing without excessive loss.

The alkylation of phenols in the presence of a mixture of a polyhydric alcohol and sulfuric acid according to our invention is particularly advantageous in a continuous type process in which the sulfuric acid-polyhydric alcohol condensing agent in admixture with the phenol is passed in continuous flow through a reaction zone where it is brought into contact with the branched-chain olefin. In this type process there are limits below which the amount of condensing agent cannot be carried because of the physical difficulty in effecting complete contact between a relatively large amount of reactants and a relatively small amount of condensing agent in a relatively short reaction time. Thus it has been difficult to effect economical continuous operation in the alkylation of phenols using the catalytic amounts of sulfuric acid heretofore known in the art. However, when a relatively large amount of the polyhydric alcohol-sulfuric acid condensing agent is used according to the method of our invention, good contact between the condensing agent and the reactants may be readily effected and a nearly complete reaction can be carried out in a short time. Furthermore, this result is accomplished without any deleterious side reactions or excessive polymerization. Also, the method of our invention has the additional advantage that the condensing agent can be readily separated from the reaction products and can be recycled for use in the alkylation of further quantities of phenol in a truly continuous operation.

Such a continuous operation of our process may, for example, be carried out in a typical countercurrent flow in which a mixture of a phenol and, for example, a sulfuric acid-glycerin condensing agent is caused to flow downward through a packed reaction tower countercurrent to an upward flow of olefin gas such as isobutylene, the tower being heated to a suitable reaction temperature. The reaction products may be led off at the bottom of the reaction tower to a settling chamber where they are allowed to stratify and the alkylated phenol reaction products are separated from the glycerin-sulfuric acid condensing agent. The condensing agent may then be recycled to the reaction tower where it is mixed with a further quantity of a phenol and used in the production of more alkylated phenol, while the alkylated phenol reaction products are treated by washing and fractionation for the isolation of individual alkylated phenols.

The method of our invention can be applied to the alkylation of substantially any phenolic material, but we have found it particularly advantageous in the alkylation of simple mono-hydroxy phenols such as phenol itself, the cresols, xylenols, and ethyl phenols as well as mixtures of such phenols such as cresylic acid.

The following specific examples will serve to illustrate the advantages of this invention and how it may be carried into effect. Wherever in these examples "parts" and "percentages" are given, parts by weight and percentages by weight are intended.

Example I

A condensing agent was prepared by mixing 35 parts of glycerin with 65 parts of sulfuric acid. 31 parts of this condensing agent and 100 parts of p-cresol were mixed together, thus providing a reaction mixture in which the amount of sulfuric acid present was about 20.0 per cent of the p-cresol. While this mixture was vigorously stirred in a reaction vessel, isobutylene was slowly passed through it at atmospheric pressure. The temperature was maintained at 70° C. After 114 parts of isobutylene (which corresponded to a 10 per cent excess thereof over the theoretical requirement for di-butylation) had been taken up by the mixture, the mixture was allowed to stand.

In a very short time a separation of the mixture into two layers had occurred, one layer containing the sulfuric acid-glycerin mixture and the other containing the reaction products. The recovery of the acid condensing agent was practically 100 per cent. The reaction products after having been washed and neutralized were fractionally distilled. Based on the weight of p-cresol employed, the yield of 2,6-di-butyl-4-methyl phenol was 81.1 per cent of the theoretical and the yield of mono-butyl-p-cresol was 4.5 per cent. Only 5 per cent of the isobutylene consumed went to form polymers.

For purposes of comparison a sample of p-cresol was treated by the same method as above except that 20.0 per cent of concentrated sulfuric acid was used as the condensing agent without the addition thereto of any glycerine. The results obtained are as follows: yield of 2,6-di-tertiary-butyl-4-methyl phenol, 42.2 per cent; yield of mono-butyl-p-cresol, 28.1 per cent; percentage of consumed isobutylene going to polymers, 14.2 per cent. From a comparison of these results the beneficial effects of the use of glycerin-sulfuric acid mixtures is readily apparent.

Example II

The procedure of Example I was repeated employing the same ratio of sulfuric acid to p-cresol. However, in this case the acid condensing mixture contained 50 per cent by weight of glycerin. The yield of 2,6-di-tertiary-butyl-4-methyl phenol was appreciably higher, being 87.2 per cent. The yield of mono-butyl-p-cresol was 4.5 per cent and the proportion of consumed isobutylene going to polymers was only 2.0 per cent.

Example III

The same procedure was carried out as in Example I, except that the condensing agent contained 50 per cent by weight of glycerin and was used in sufficient amount to provide sulfuric acid in an amount corresponding to about 40.0 per cent of the weight of the p-cresol. The yield of 2,6-di-tertiary-butyl-4-methyl phenol was 81.7 per cent. The yield of mono-butyl-p-cresol was 8.1 per cent and the proportion of consumed isobutylene going to polymers was 3.6 per cent. In a similar test in which 40 per cent by weight of sulfuric acid was used without the addition of any glycerin or other polyhydric alcohol only about 16.3 per cent of 2,6-di-tertiary-butyl-4-methyl phenol and 22.7 per cent of monobutyl para cresol were obtained while about 15.7 per cent of the isobutylene went to polymer and a large amount of p-cresol remained unalkylated.

Example IV

In this case, a condensing agent consisting of 72 per cent glycerin and 28 per cent sulfuric acid was employed in amount sufficient to provide sulfuric acid in an amount corresponding to about 20.0 per cent by weight of the p-cresol. Isobutylene was passed through a p-cresol-sulfuric acid mixture containing 100 parts of p-cresol. The temperature was maintained at 70° C. and the pressure at atmospheric. After 77 parts of isobutylene (i. e. about 50 per cent more than theoretically required for mono-butylation) had been taken up, the reaction was stopped. The catalyst separated practically completely in a few minutes and was in excellent condition for reuse. The product was neutralized and washed. The yield of mono-butyl p-cresol was 52.6 per cent. The yield of 2,6-di-tertiary-butyl-4-methyl phenol was 29.5 per cent, and the proportion of consumed isobutylene going to polymers was only 0.5 per cent.

This procedure illustrates how the condensing agent of this invention can be adapted to favor mono-alkylation.

Example V

In this case, the condensing agent consisted of 38.8 per cent ethylene glycol and the balance sulfuric acid. The procedure was otherwise identical with that of Example I employing sufficient catalyst to provide a p-cresol-sulfuric acid ratio of 100:20. The yield of 2,6-di-tertiary-butyl-4-methyl phenol was 79.1 per cent, and the yield of mono-butyl-p-cresol was 9.2 per cent. The proportion of consumed isobutylene going to polymers was 4.0 per cent.

Example VI

In this case, a condensing agent consisting of 80 per cent glycerin and 20 per cent sulfuric acid was used. 200 parts of this catalyst and 100 parts of phenol were mixed, thereby providing a phenol-sulfuric acid ratio of 100:40. While this mixture was vigorously stirred, isobutylene was slowly passed through it at atmospheric pressure until 82.5 parts thereof were absorbed. The temperature was maintained at 70° C. The mixture was allowed to stand and in a short time it had separated into two layers, one containing the condensing agent and the other containing reaction products. The reaction products were withdrawn and after washing and neutralization fractionally distilled. Basing the calculations on the amount of phenol used, the yield of mono-tertiary-butyl phenol (a mixture of isomers) was 50.8 per cent of the theoretical, while the yield of di-butylated phenolic material, similarly calculated, was 15.7 per cent.

While our invention has been described with particular reference to specific embodiments thereof it is not intended that it shall be limited to the specific details of such embodiments except as hereinafter defined in the appended claims.

What we claim is:

1. An improved method for the alkylation of phenols with olefins comprising treating a liquid mixture consisting essentially of at least one phenol, sulfuric acid in an amount corresponding to at least about 5.0 per cent by weight of said phenol and an amount of a polyhydric alcohol corresponding to about 35.0 to 85.0 per cent by weight of the sulfuric acid, with an olefin selected from the group consisting of propylene and the branched-chain olefins at a temperature between 20° and 100° C., settling the reaction mixture and separating the layer of alkylated phenol reaction products from the layer of polyhydric alcohol-sulfuric acid thus formed.

2. An improved method for the poly-alkylation of phenols with olefins comprising treating a liquid mixture consisting essentially of at least one phenol, sulfuric acid in an amount corresponding to at least about 5.0 per cent by weight of said phenol and an amount of a polyhydric alcohol corresponding to about 35 to 60 per cent by weight of sulfuric acid, with an olefin selected from the group consisting of propylene and the branched-chain olefins at a temperature between 20° and 100° C., settling the reaction mixture and separating the layer of alkylated phenol reaction products from the layer of polyhydric alcohol-sulfuric acid thus formed.

3. An improved method for the alkylation of phenols with olefins comprising treating a liquid mixture consisting essentially of at least one phenol, sulfuric acid in an amount corresponding to at least about 5.0 per cent by weight of said phenol and an amount of glycerin corresponding to about 35 to 60 per cent by weight of the sulfuric acid, with a branched-chain olefin at a temperature between 20° and 100° C., settling the reaction mixture and separating the layer of alkylated phenol reaction products from the layer of glycerin and sulfuric acid thus formed.

4. An improved method for the alkylation of phenols with olefins comprising treating a liquid mixture consisting essentially of at least one phenol, sulfuric acid in an amount corresponding to at least about 5.0 per cent by weight of said phenol and an amount of glycerin corresponding to about 45 to 55 per cent by weight of the sulfuric acid with a branched-chain olefin at a temperature between 20° and 100° C., settling the reaction mixture and separating the layer of alkylated phenol reaction products from the layer of glycerin-sulfuric acid thus formed.

5. An improved method for the mono-alkylation of phenols with olefins comprising treating a liquid mixture consisting essentially of at least one phenol, sulfuric acid in an amount corresponding to at least about 5.0 per cent by weight of said phenol and an amount of a polyhydric alcohol corresponding to about 65 to 85 per cent by weight of the sulfuric acid with an olefin selected from the group consisting of propylene and the branched-chain olefins at a temperature between 20° and 100° C., settling the reaction mixture and separating the layer of alkylated phenol reaction products from the layer of polyhydric alcohol-sulfuric acid thus formed.

6. An improved method for the mono-alkylation of phenols with olefins comprising treating a liquid mixture consisting essentially of at least one phenol, sulfuric acid in an amount corresponding to at least about 5.0 per cent by weight of said phenol and an amount of glycerin corresponding to about 65 to 85 per cent by weight of the sulfuric acid with a branched-chain olefin at a temperature between 20° and 100° C., settling the reaction mixture and separating the layer of alkylated phenol reaction products from the layer of glycerin-sulfuric acid mixture.

7. An improved method for the mono-alkylation of phenols with olefins comprising treating a liquid mixture consisting essentially of at least one phenol, sulfuric acid in an amount corresponding to at least about 5.0 per cent by weight of said phenol and an amount of glycerin corresponding to about 70 to 80 per cent by weight of the sulfuric acid with a branched-chain olefin at a temperature between 20° and 100° C., settling the reaction mixture and separating the layer of alkylated phenol reaction products from the layer of glycerin-sulfuric acid mixture.

DONALD R. STEVENS.
JOSEPH E. NICKELS.